(12) United States Patent
Hill

(10) Patent No.: US 10,843,614 B1
(45) Date of Patent: Nov. 24, 2020

(54) PIPELINE INSTALLATION APPARATUS AND METHOD

(71) Applicant: Gaylord Dean Hill, Bakersfield, CA (US)

(72) Inventor: Gaylord Dean Hill, Bakersfield, CA (US)

( * ) Notice: Subject to any disclaimer, the term of this patent is extended or adjusted under 35 U.S.C. 154(b) by 360 days.

(21) Appl. No.: 15/807,121

(22) Filed: Nov. 8, 2017

Related U.S. Application Data

(60) Provisional application No. 62/419,381, filed on Nov. 8, 2016.

(51) Int. Cl.
 *B60P 1/00* (2006.01)
 *E04G 21/14* (2006.01)
 *B23K 9/028* (2006.01)
 *B60P 3/40* (2006.01)

(52) U.S. Cl.
 CPC .............. *B60P 1/00* (2013.01); *B23K 9/0282* (2013.01); *B60P 3/40* (2013.01)

(58) Field of Classification Search
 CPC .... E04G 21/14; B60P 1/00; B60P 1/28; B60P 1/52; B60P 1/56; B60P 3/40; B60P 3/41; B23K 9/0282; B23K 9/0286; E21B 19/14; E21B 19/146; E21B 19/15; E21B 19/155; E21B 17/00; E21B 17/21
 USPC ............... 219/59.1–61; 414/331.01–331.018, 414/745.4–745.5, 22.66; 175/52, 85
 See application file for complete search history.

(56) References Cited

U.S. PATENT DOCUMENTS

| | | | | |
|---|---|---|---|---|
| 3,034,668 A | * | 5/1962 | Wicks | A01G 25/09 414/508 |
| 3,493,061 A | * | 2/1970 | Gyongyosi | E21B 19/146 175/52 |
| 3,721,358 A | * | 3/1973 | Brock | B60P 3/00 414/460 |
| 3,724,695 A | * | 4/1973 | Taylor | B60P 1/28 414/484 |
| 4,068,764 A | * | 1/1978 | Loeber | B60P 3/40 180/8.1 |

(Continued)

*Primary Examiner* — Paul R Durand
*Assistant Examiner* — Andrew P Bainbridge
(74) *Attorney, Agent, or Firm* — James M. Duncan; Scanlon Duncan LLP

(57) ABSTRACT

A machine which transports and positions joints of line pipe has a trailer member having at least two ground engaging wheels and a distributor box disposed within the trailer member. The distributor box has a top, a bottom, a front and a back, where a longitudinal axis is defined between the front and the back. A shaft is rotationally supported between the front and the back, where the shaft has an axis coinciding with the longitudinal axis. A plurality of spaced-apart disks are mounted on the rotatable shaft, where each disk has a plurality of slots radially extending to a circumferential edge of the disk, where each slot is open-ended at the circumferential edge and each disk of the plurality of spaced-apart disks has a slot in axial alignment with a slot of the other spaced-apart disks. The group of the axially aligned slots is adapted to receive a joint of the line pipe. A conveyor is at the bottom of the distributor box, so configured that as the rotatable shaft turns, the conveyor is adapted to receive the joint of line pipe dropping from the group of the axially aligned slots and feed the joint of line pipe out of an opening at the back of the trailer member.

17 Claims, 12 Drawing Sheets

(56) References Cited

U.S. PATENT DOCUMENTS

| | | | | |
|---|---|---|---|---|
| 4,445,579 A * | 5/1984 | Bello | E21B 19/146 | 175/52 |
| 4,455,116 A * | 6/1984 | Lindstedt | E21B 19/146 | 175/52 |
| 4,549,060 A * | 10/1985 | Paton | B23K 11/0073 | 219/59.1 |
| 4,569,531 A * | 2/1986 | Beadle | B60P 3/40 | 280/149.2 |
| 4,591,294 A * | 5/1986 | Foulkes | B23K 9/0286 | 219/121.63 |
| 4,892,160 A * | 1/1990 | Schivley, Jr. | E21B 19/146 | 175/52 |
| 4,897,009 A * | 1/1990 | Powell | E21B 19/146 | 175/52 |
| 5,297,642 A * | 3/1994 | Rajakallio | E21B 19/146 | 175/85 |
| 5,358,371 A * | 10/1994 | Neddo | F16L 1/065 | 198/532 |
| 5,954,209 A * | 9/1999 | Wurm | E21B 19/146 | 175/52 |
| 6,814,214 B2 * | 11/2004 | Warlow | B65D 19/08 | 198/300 |
| 7,037,042 B2 * | 5/2006 | Wilkinson | F16L 1/10 | 405/154.1 |
| 7,985,043 B2 * | 7/2011 | Cook | B60P 1/02 | 414/331.14 |
| 8,033,777 B2 * | 10/2011 | Janecek | B60P 3/40 | 414/546 |
| 8,151,903 B2 * | 4/2012 | Crawford | E21B 19/24 | 175/52 |
| 8,635,768 B2 * | 1/2014 | Kapelski | B65D 90/002 | 29/809 |
| 9,080,693 B2 * | 7/2015 | Cheney | F16L 1/036 | |
| 9,856,120 B2 * | 1/2018 | Kim | B66C 1/30 | |
| 10,112,659 B2 * | 10/2018 | Tsumiyama | B62D 33/02 | |
| 10,166,621 B2 * | 1/2019 | Ito | B23K 9/0286 | |
| 10,427,582 B2 * | 10/2019 | Kappi | A01G 23/00 | |
| 2007/0258798 A1 * | 11/2007 | Foster | B65G 69/003 | 414/331.01 |
| 2011/0232971 A1 * | 9/2011 | Harmon | E21B 19/146 | 175/85 |
| 2014/0262155 A1 * | 9/2014 | Miller | B23K 37/003 | 165/104.11 |
| 2017/0232541 A1 * | 8/2017 | Acquaye | B23K 9/0052 | 219/61 |
| 2018/0001422 A1 * | 1/2018 | Rajagopalan | B23K 26/044 | |
| 2018/0215303 A1 * | 8/2018 | Hoy | B60P 1/52 | |

* cited by examiner

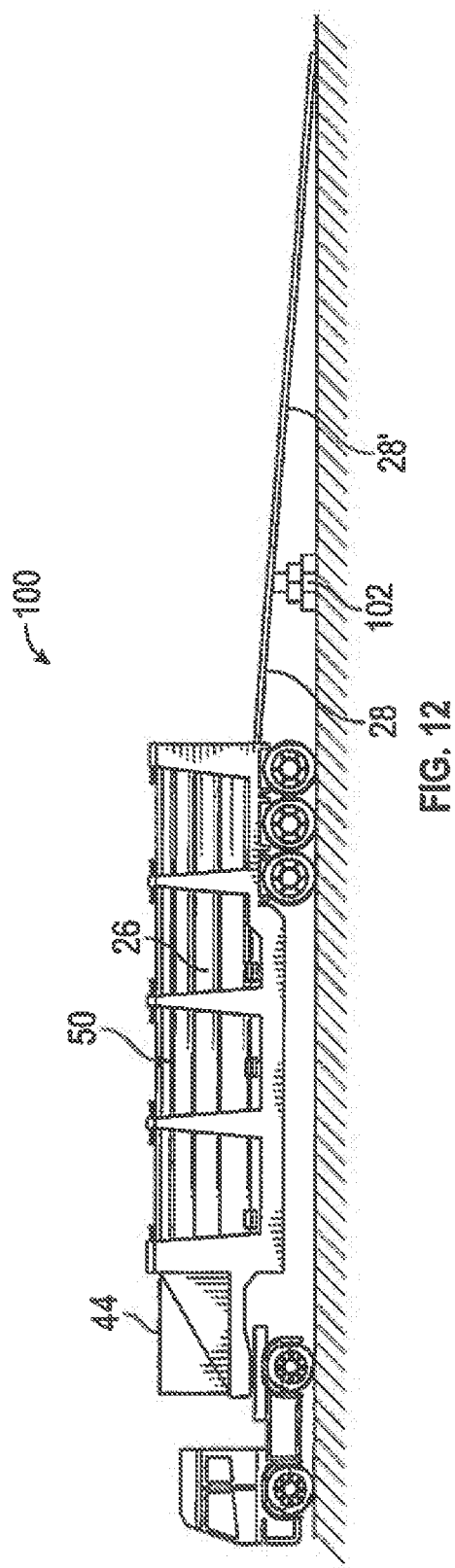

PIPELINE INSTALLATION APPARATUS AND METHOD

RELATED APPLICATIONS

This application claims priority to provisional patent application No. 62/419,381 filed on Nov. 8, 2016.

BACKGROUND OF THE INVENTION

The present invention generally relates to installation equipment and methods for pipelines utilized for transmission of water, gas, oil, and other liquids. More specifically, the present invention relates to installation devices which transport multiple joints of pipe and which string and weld individual joints of pipe in the right-of-way. The pipe joints utilized in the present invention have a nominal length of 40 feet, with actual lengths ranging from 38 to 42 feet, with diameters ranging from 2 to 20 inches.

The usual procedure which is currently practiced for loading pipe joints and stringing the pipe joints for assembly of a pipeline is a multi-step process which requires a number of pieces of equipment and significant personnel. The typical process includes clearing and grading a pipeline right-of-way which is approximately 50 feet wide with an additional 25 feet of temporary easement which is utilized by the equipment required for placing the joints of pipe and welding the pipe joints together. Clearing the pipeline right-of-way typically requires a dozer, a front-end loader, a water truck, and a dump truck. Under the known methods, approximately 100 to 200 feet of right-of-way may be cleared in a day.

Lengths of pipe are loaded on a truck at a warehouse with a forklift. The pipe lengths are stacked and strapped down to a tractor trailer and delivered to the field, where the pipe is offloaded with a forklift staged in pods along the right-of-way. Once in the field, the pipe is staged along with right-of-way in an end-to-end configuration for welding, where the pipe lengths are manipulated by a side boom or crane. Once the pipe lengths are staged, the pipe lengths are welded together. This process typically involves two separate crews, with a front end crew which moves the pipe into position and welders which run a bead, and a follow-up crew which completes the welding.

In addition to the equipment required for preparation of the right-of-way, the process described above requires significant equipment which may include one or more forklifts, tractor trailers, water trucks, side booms or cranes, and welding trucks. Personnel are required for operating each piece of equipment, as well as welders, spotters and fitters, typically comprising about 8 people. With the above described process, 8 to 10 welds having a ten inch length are typically completed.

SUMMARY OF THE INVENTION

The present invention provides a single apparatus which may be used to replace most, if not all, of the equipment required for loading, staging, and welding the pipe as described above. Moreover, because the present invention comprises a single apparatus which does not require the use of a side boom or crane for stringing the pipe, the width of the required right-of-way is significantly reduced. Utilization of the apparatus and method described herein requires the clearing and grading of a right-of-way which is 20 feet wide with an additional 25 feet of temporary easement. Embodiments of the apparatus and method typically require 3 people for operation. With the disclosed apparatus and method, 15 welds having a ten inch length are achievable.

The disclosed apparatus is referred to herein as a "string weld machine". The string weld machine comprises a goose neck trailer supported by ground engaging wheels. The goose neck trailer may be a 50 ton fixed gooseneck lowboy trailer. The trailer will typically be approximately 53 feet long and have a trailer weight capacity of 100,000 lbs.

A distributor box section is mounted within or attached to the goose neck trailer. The distributor box section has a top, a bottom, a front and a back, where a longitudinal axis is defined between the front and the back. The bottom of the distributor box has a bottom having a pipe conveyor extending longitudinally along a portion of its length.

The distributor box has a shaft rotationally supported between the front and the back, where the shaft has an axis coinciding with the longitudinal axis. The shaft will typically be supported between the front and back of the distributor box, with each end of the shaft supported by an appropriate bearing, such as a cylindrical roller bearing or taper bearing. The distributor box will typically have a width of no more than 8 feet.

A plurality of spaced-apart disks are mounted on the rotatable shaft in facing relation to form a distribution drum 50, as schematically indicated in FIG. 12. The distribution drum may be rotated by the use of four electric motors with gear reduction gear boxes, with two motors on each side of the top opening of the distribution box. The electric motors may be powered by a welding machine generator, where the welding machine is carried as a component of the trailer and may be controlled by a hand-held remote by either a person on top of the distributor box loading pipe or by a person on the ground behind the unit. The motors allow the distribution drum to be rotated in either direction.

The motors may be linked to the distribution drum by four drive gears which may be positioned at approximately the one o'clock, the two o'clock, the ten o'clock, and the 11 o'clock positions on each of the disks of the distribution drum, as shown in better detail in FIG. 11A, which gears are connected by shaft as shown in the Figure. The drive gears engage gear segments on the periphery of each disk of the distribution drum. Two gears are positioned on each side of the top opening to allow the distribution drum to continue rotation as a drive gear passes an open socket which having no gear segment. The distribution drum is configured such that the load of the pipe is carried at the load bearing surfaces of the disks of the distribution drum.

Each disk has a plurality of slots, each slot having an opening at the circumferential edge of the disk and extending radially inward toward the center of the disk. Each disk of the plurality of spaced-apart disks has a slot in axial alignment with a slot of the other spaced-apart disks such that a group of the axially aligned slots may receive a joint of line pipe. The inventor herein has determined that a total of five spaced-apart disks provide satisfactory support for the variety of line pipe which may be utilized with the present invention. Embodiments of the present invention may transport and install the following amounts of 40 foot joints of line pipe:

- 72 joints of 2" schedule 80 pipe @ 14,457 lbs=144 weld inches per load
- 64 joints of 3" schedule 80 pipe @26,340 lbs=192 weld inches per load
- 48 joints of 4" schedule 80 pipe @ 28,761 lbs=192 weld inches per load
- 40 joints of 6" schedule 40 pipe @ 30,352 lbs=240 weld inches per load 32 joints of 8" schedule 40 pipe @ 36,544 lbs=256 weld inches per load 24 joints of 10" schedule 40 pipe @ 36,860 lbs=240 weld inches per load 16 joints of 12" schedule 40 pipe @31,718 lbs=192 weld inches per load 8 joints of 14" schedule 40 pipe @ 20,300 lbs=112 weld inches per load 8 joints of 16" schedule 40 pipe @ 16,726 lbs=128 weld inches per load 8 joints of 18" schedule 40 pipe @ 22,588 lbs=144 weld inches per load 8 joints of 20" schedule 40 pipe @ 25,152 lbs=160 weld inches per load Each spaced apart disk will have a sufficient number of slots to accommodate the number of joints for a desired load. Therefore, based upon the above load capacities, each disk will have either 8 slots, 16, slots, 24 slots, 32 slots, 40 slots, 48 slots, 64 slots or 72 slots. Alternatively, each spaced apart disk will accommodate bolt on segments, with each bolt on segment adapted for a particular pipe size and number of slots. Thus a single machine may, through the use of the bolt on segments, accommodate pipe ranging from 2" to 20" in diameter. The slots, as well as other surfaces which come into contact with the surface of the pipe joints, may have TEFLON wear pads and cushioning to protect the pipe as it is loaded, handled, and discharged by the machine. This padding and cushioning protects the exterior surface of the pipe joint, which can be particularly important for pipe joints having exterior coatings for corrosion resistance, where a dent in the coating can cause a corrosion hotspot.

The distributor box further has a conveyor at the bottom, wherein as the rotatable shaft turns such that when a group of aligned slots points downward, the conveyor receives the joint of line pipe as it drops from the group of the axially aligned slots. The conveyor feeds the joint of line pipe out of an opening at the back of the trailer member.

The distributor box may further comprise blocking structures which are selectively closeable over the conveyor. The blocking structures prevent a joint of pipe from falling into the conveyor before it is desired to layout the joint in the right-of-way. As can be appreciated, without the blocking structure, a joint of pipe would drop from the slots as soon as the open slots are facing downward. The blocking structures prevent the pipe from falling into the conveyor during loading and during transport. FIG. 11A shows an embodiment of blocking structure in greater detail. It is to be further noted that the clearances between the open end of each slot and the sides of the distributor box are sufficiently tight to prevent pipe prematurely slipping out of its slot. The pipe is only released from the slot when the open slot reaches the six o'clock position and the blocking structures have been opened. Once the blocking structures have been opened, the joint of pipe is released onto the conveyor, which delivers the joint of pipe through an opening at the rear of the distribution box.

Embodiments of the invention may further comprise a welding machine mounted to the trailer. In addition, embodiments of the invention may comprise a water tank mounted to the trailer. With these additions, the present invention provides all of the necessary equipment for laying out each joint of the pipeline into the right-of-way and then welding each joint of pipe together.

BRIEF DESCRIPTION OF THE DRAWINGS

FIG. 12 schematically shows an embodiment of the invention in operation.

DETAILED DESCRIPTION OF THE INVENTION

Figure 1:
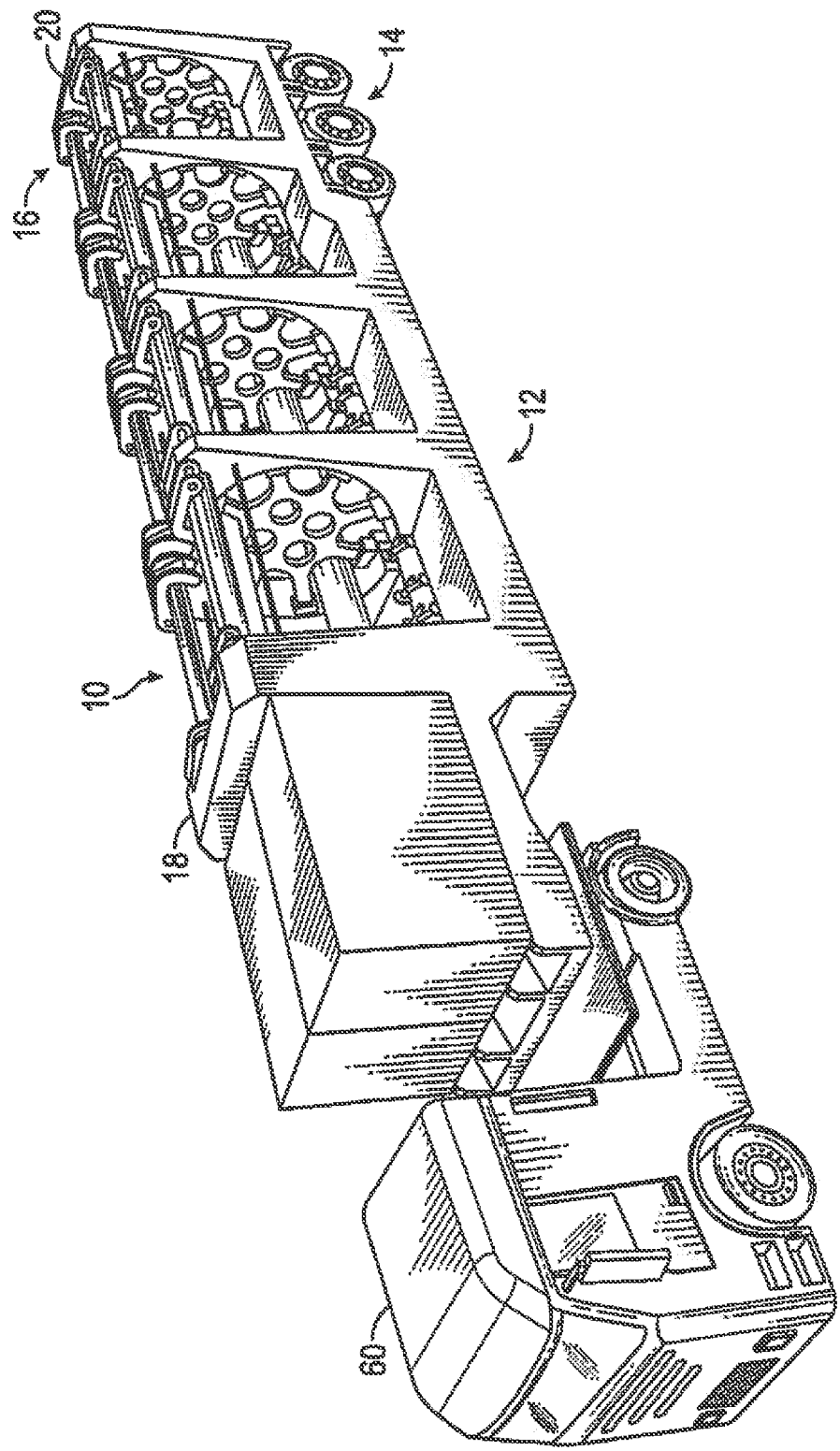
FIG. 1 depicts a front perspective view of an embodiment of the invention without a full load of pipe.
Figure 2:
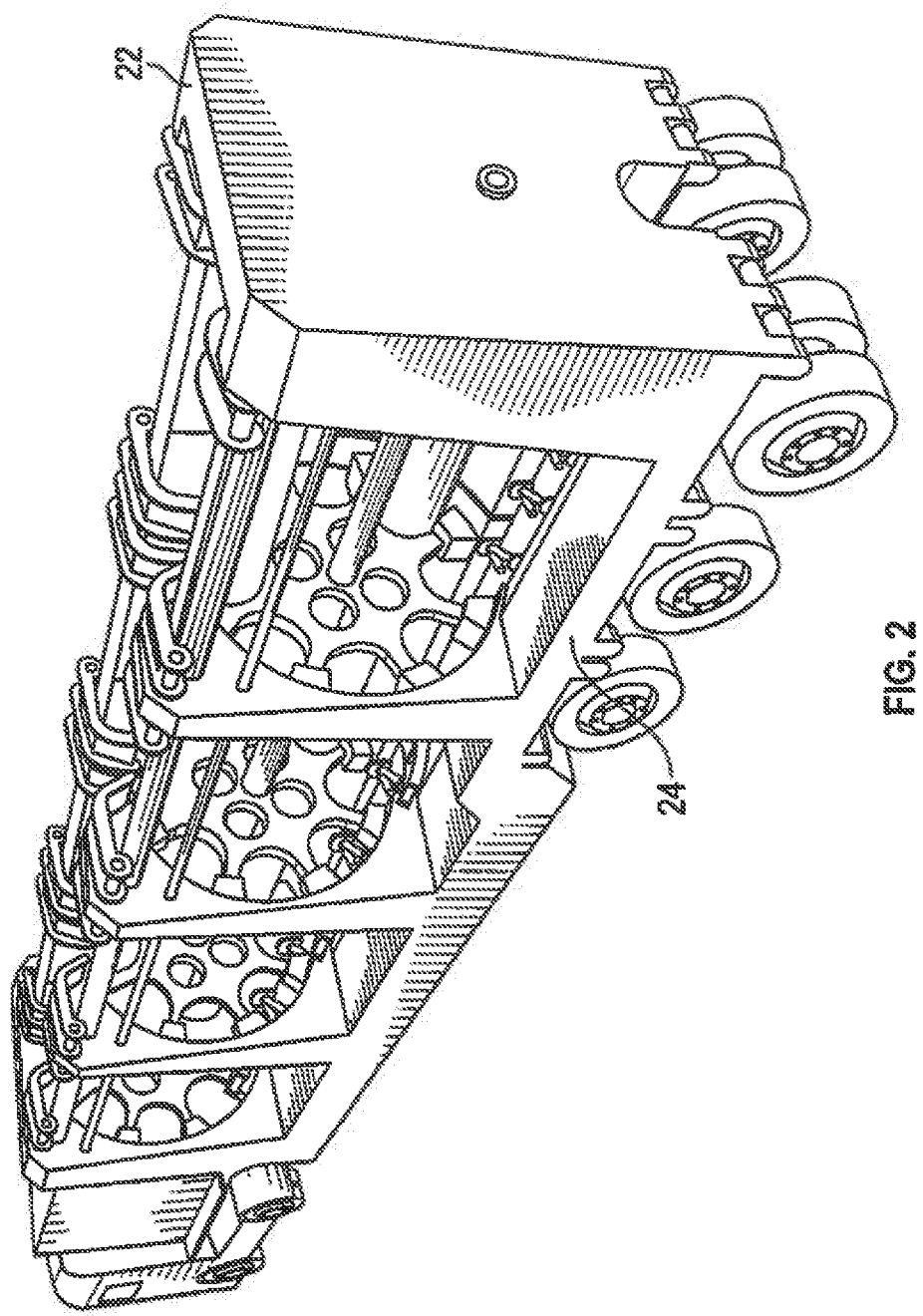
FIG. 2 depicts a rear perspective view of an embodiment of the invention without a full load of pipe.
Figure 3:
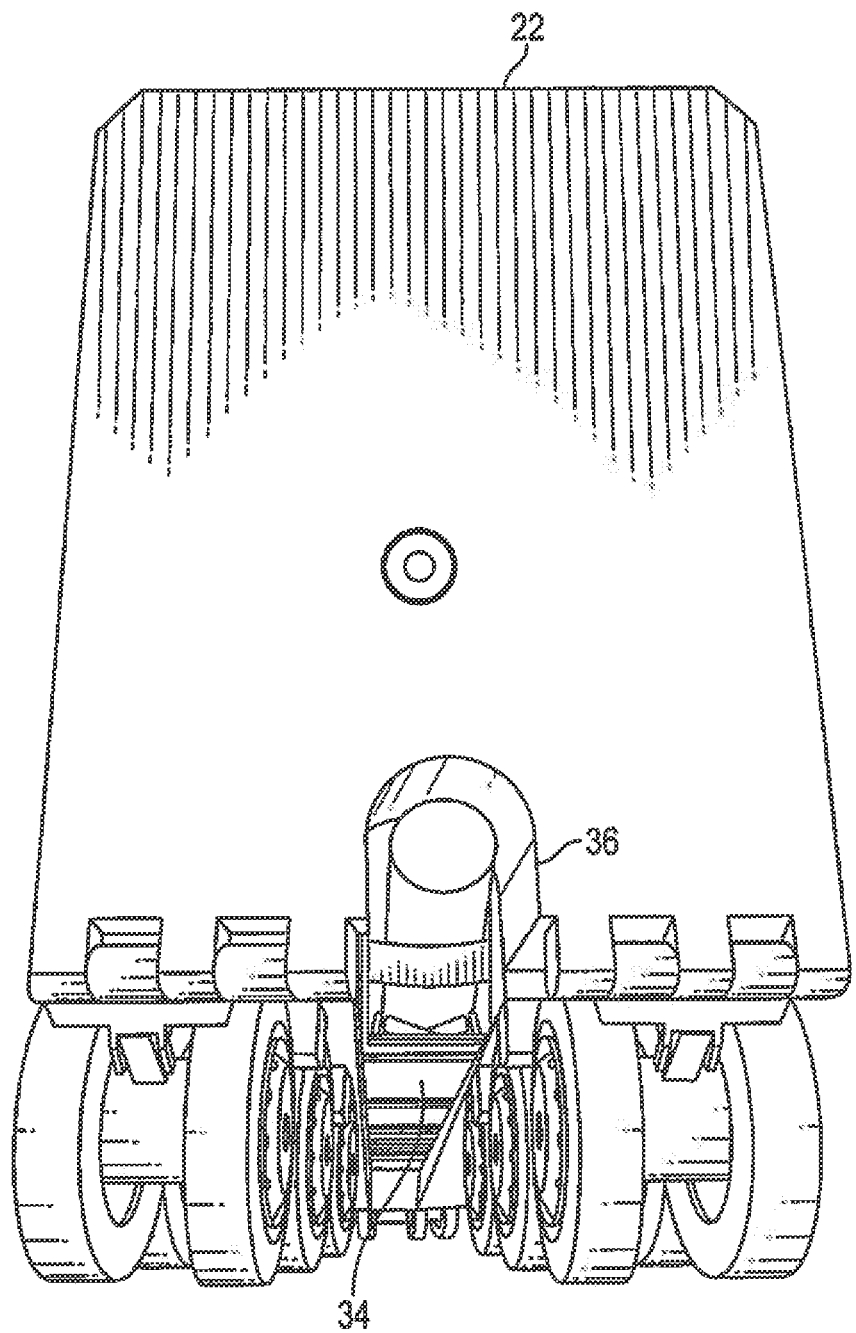
FIG. 3 depicts a rear view of an embodiment of the invention.
Figure 4:
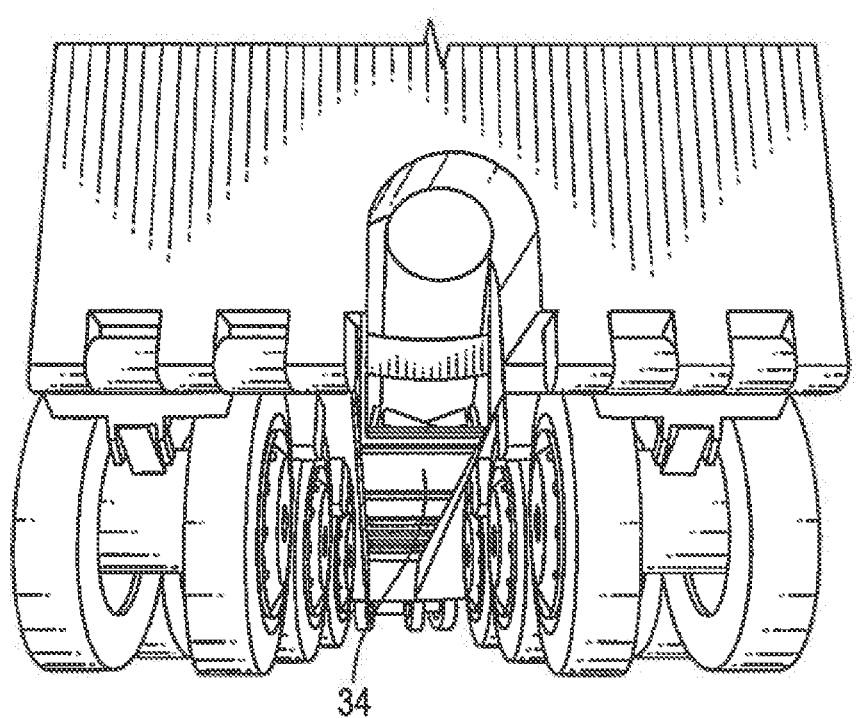
FIG. 4 depicts a detailed rear view of an embodiment of the invention.
Figure 5:
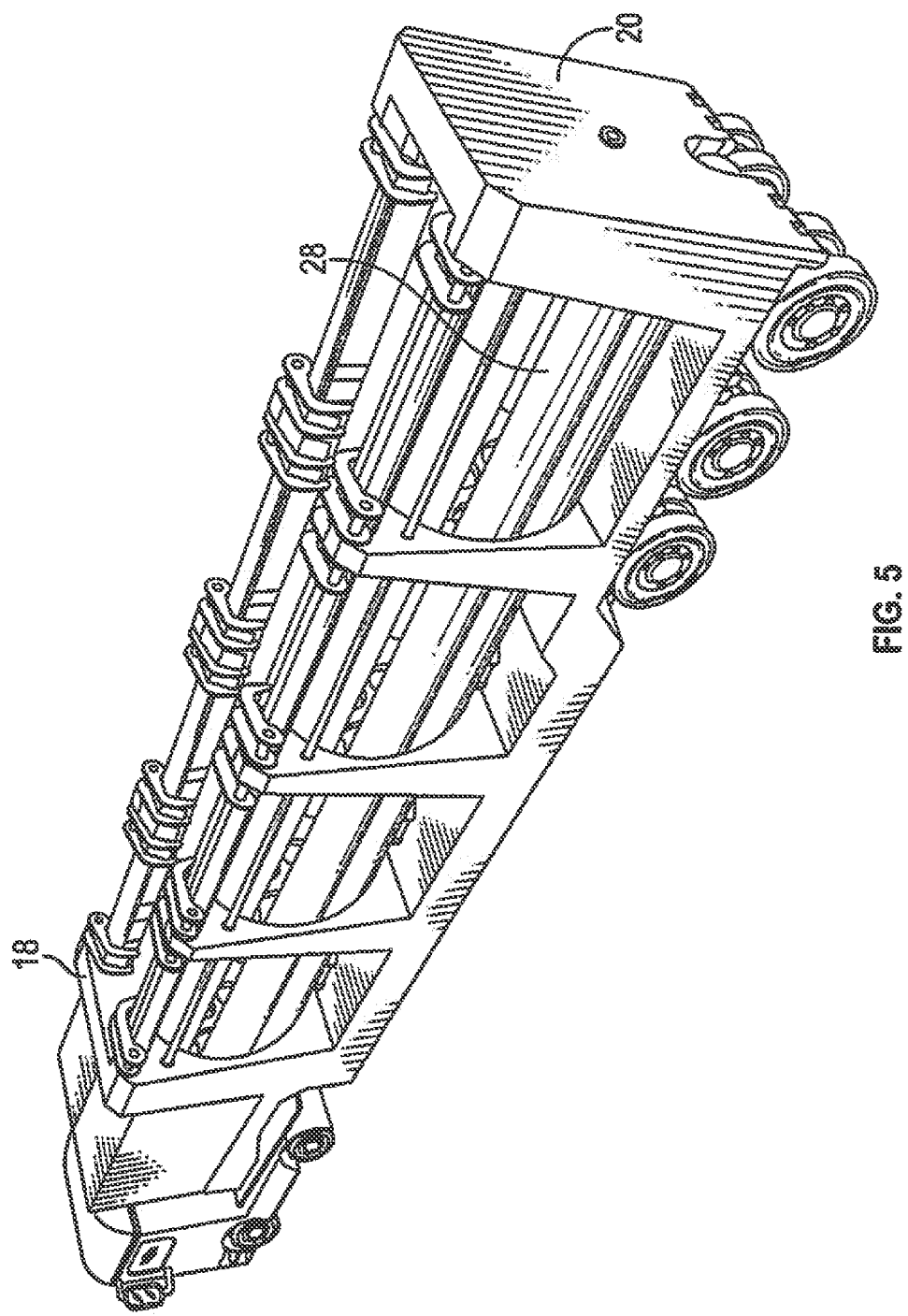
FIG. 5 depicts a rear perspective view of an embodiment of the invention having a full load of pipe.
Figure 6:
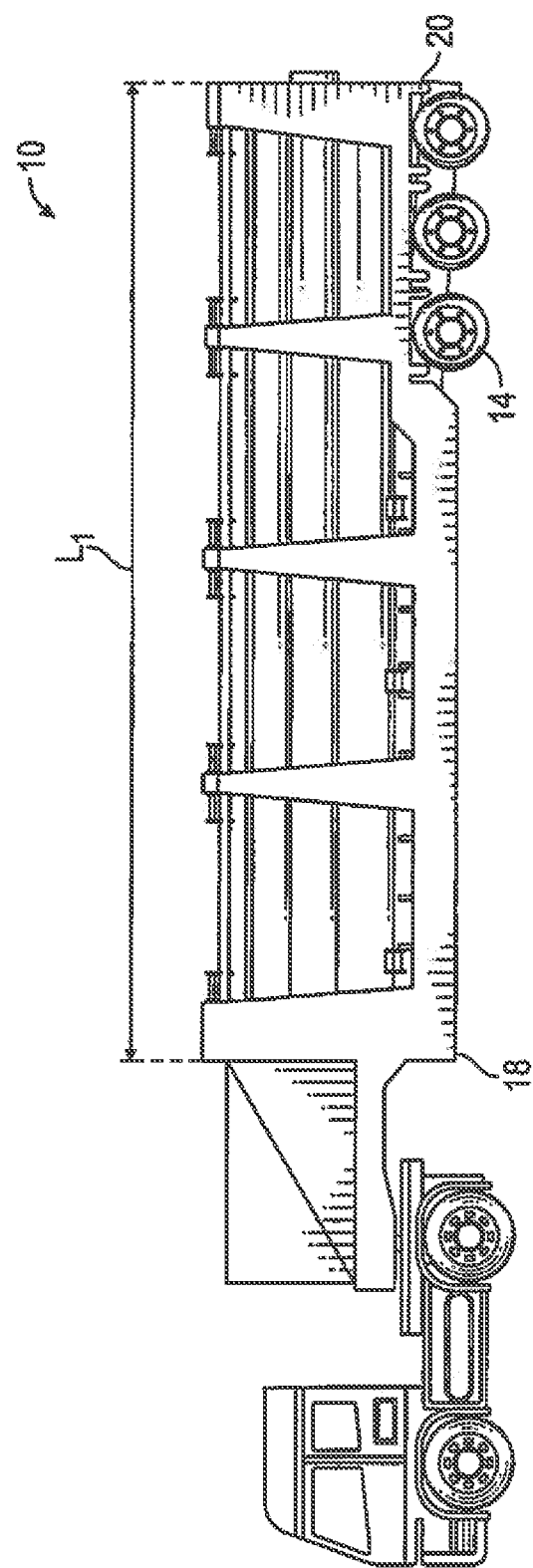
FIG. 6 depicts a side view of an embodiment of the invention having a full load of pipe.

Referring now to the drawings, FIGS. 1-12 depict an embodiment of the presently disclosed pipeline installation apparatus 10 in a partially loaded and in a fully loaded configuration. Embodiments of the invention may comprise a trailer member 12 having ground engaging wheels 14. The trailer member 12 may be of the gooseneck lo-boy variety as indicated in FIG. 1. A distributor box 16 is mounted to the trailer member 12. The distributor box 16 has a front 18, a back 20, a top 22 and a bottom 24. A longitudinal axis $L_1$ is defined between front 18 and back 20. Trailer member 12 may be pulled a tractor unit 60 of the type generally utilized for transporting heavy loads across highways.

Figure 7:
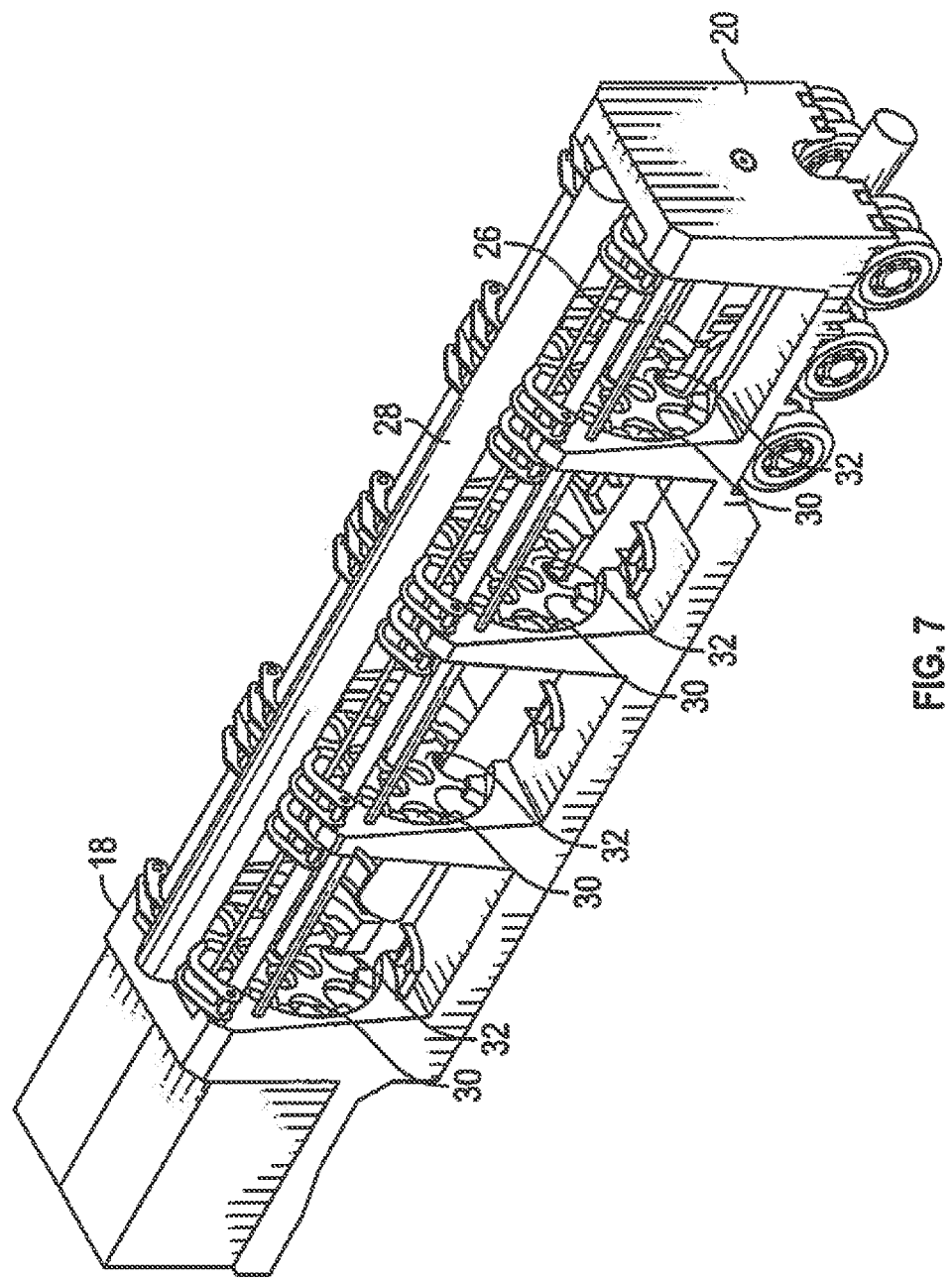
FIG. 7 depicts a rear perspective side view of an embodiment of the invention releasing a joint of pipe.
Figure 8:
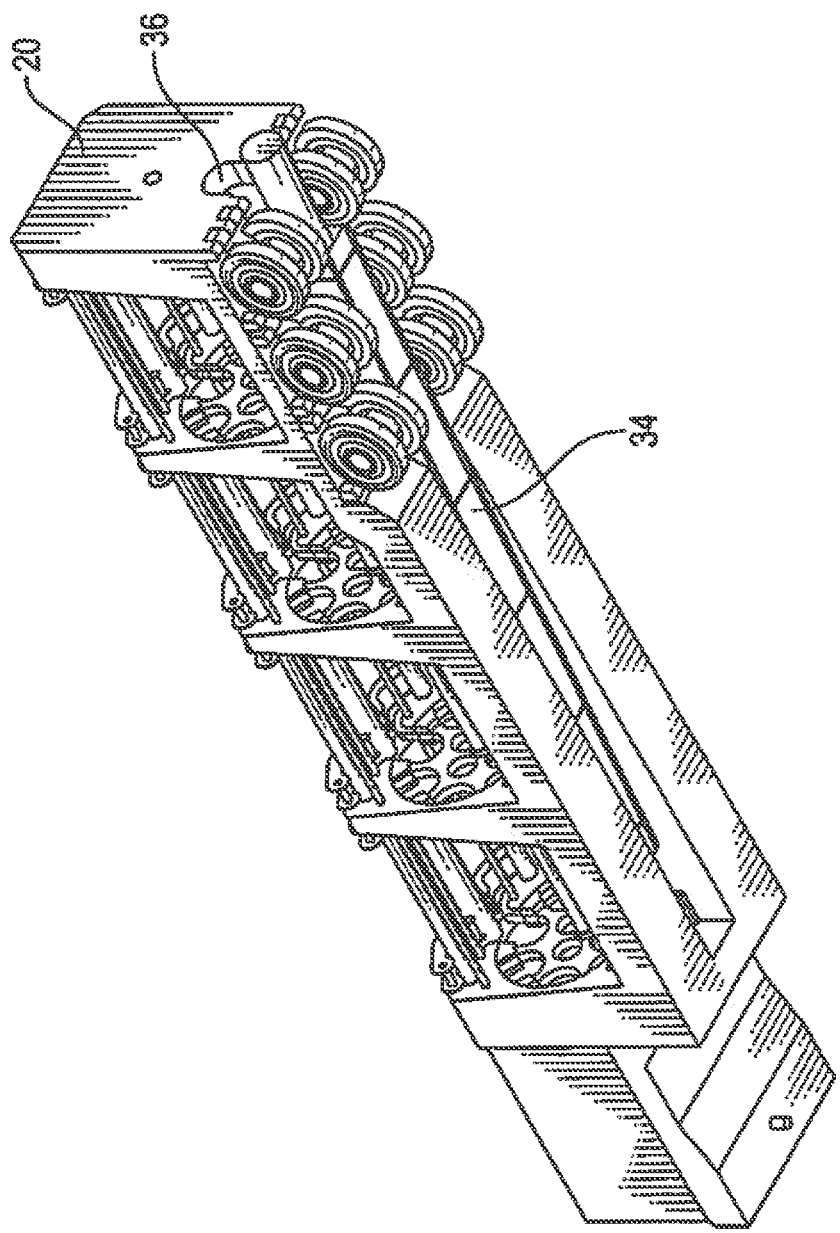
FIG. 8 depicts a bottom perspective view of an embodiment of the invention releasing a joint of pipe.
Figure 9:
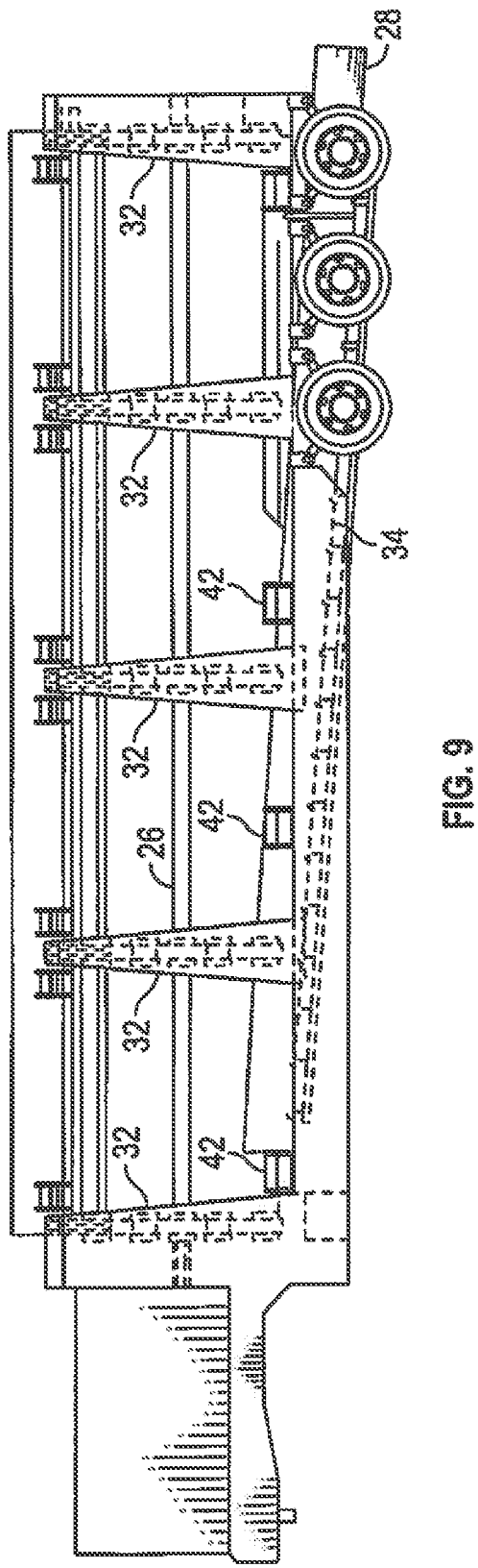
FIG. 9 depicts a side view of an embodiment of the invention releasing a joint of pipe.
Figure 10:
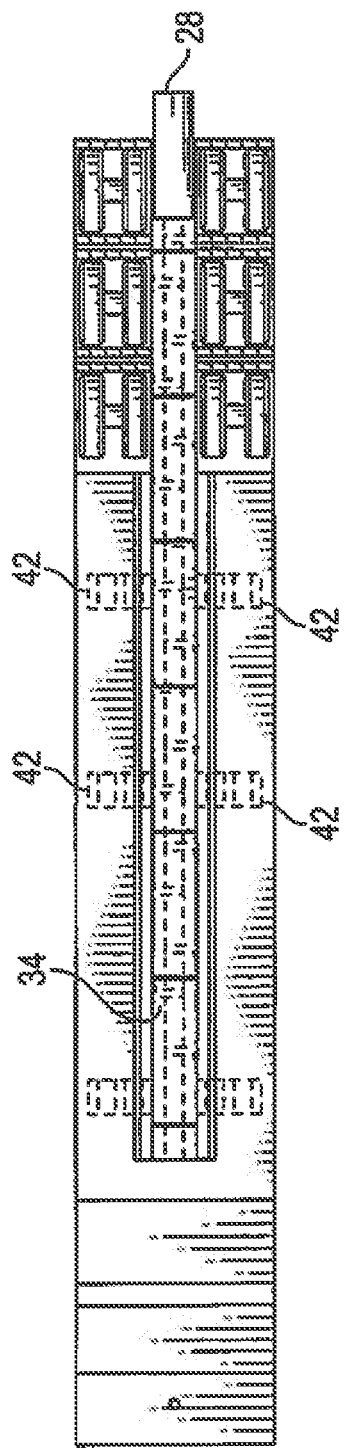
FIG. 10 depicts a bottom view of an embodiment of the invention.
Figure 11:
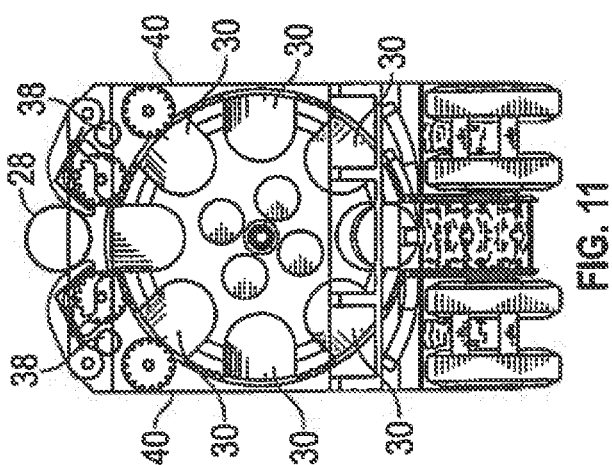
FIG. 11 depicts a rear view of an embodiment of the invention.
Figure 11A:
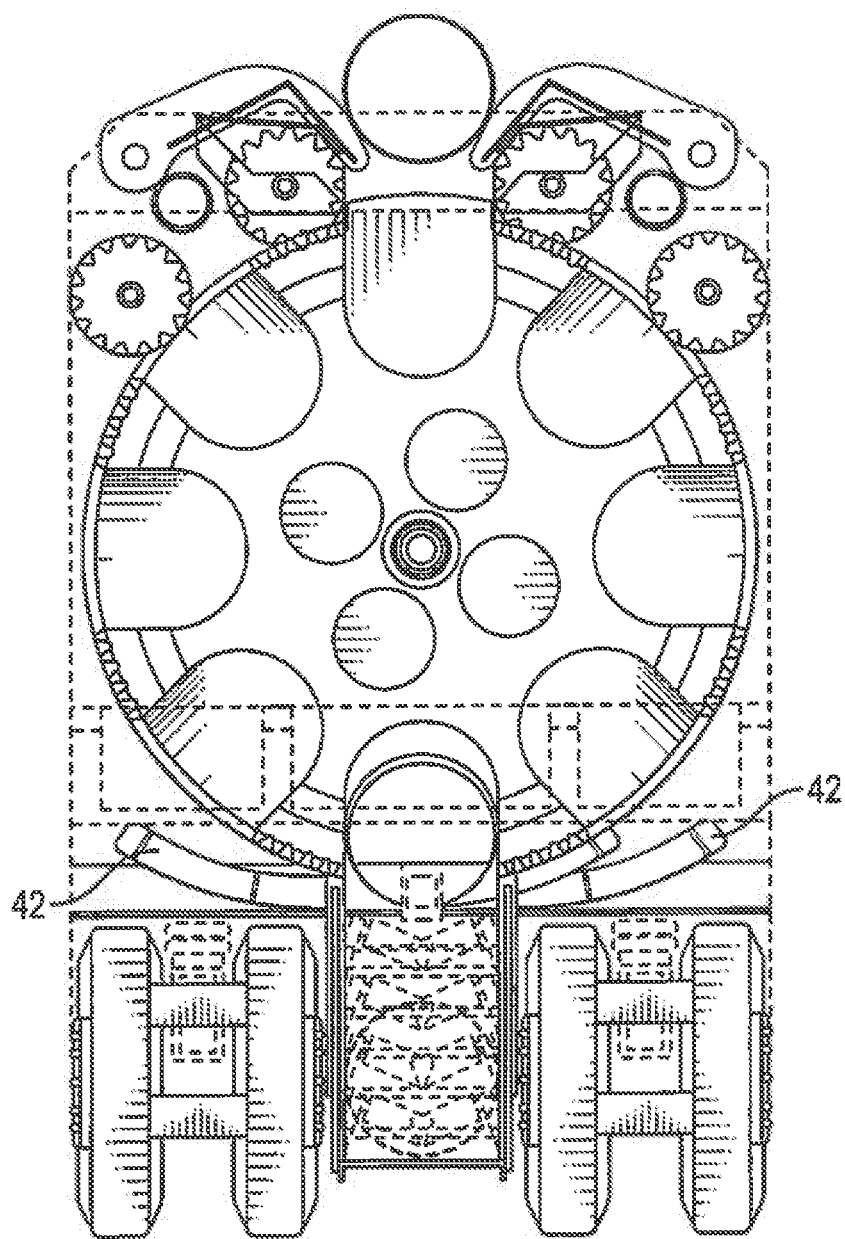
FIG. 11A is a detailed view of FIG. 11.

As best shown in FIG. 7, distributor box 16 houses a longitudinal shaft 26 which is supported at the front 18 and back 20 of the distributor box. FIG. 7 shows a joint of line pipe 28 being loaded into the distributor box 16. As the joint of line pipe 28 is loaded, it is guided into slots 30 which are in a plurality of spaced-apart disks 32. The plurality of spaced-apart disks 32 and the shaft 26 collectively comprise a distribution drum. Each of the spaced-apart disks 32 has a plurality of slots 30, each slot open-ended at a circumferential edge of the disk. The slots 30 of each spaced-apart disk are in axial alignment with a similarly positioned slot of the other disks. In other words, a slot at the three o'clock position in the front disk will be in alignment with slots of all of the other disks, which also will be at the three o'clock position. With this configuration, a joint of line pipe 28 may be loaded into the aligned slots 30 of all of the disks 32. Once the joint of line pipe 28 is loaded, the distribution drum rotates making the adjacent set of aligned slots 30 available for loading a joint of line pipe 28.

The clearance between the ends of the slots 30 and the inside walls of the distributor box 16 is sufficiently close that the smallest size pipe joint 28 (i.e., 2" diameter pipe) cannot come out of the slot until the slot reaches the 6 o'clock position. Moreover, a plurality of moveable blocking plates 42 may be utilized to maintain the pipe joints in a slot at the 6 o'clock position until the moveable blocking plates 42 are opened, allowing the pipe joint 28 to drop out of the slot 30. The moveable blocking plates are curved structures approximately matching the curvature of the bottom of the disks 32. The moveable blocking plates may be actuated by electric, hydraulic, or pneumatic motors, or be actuated by ram devices. Alternatively, the moveable blocking plates may be actuated manually by an operator.

A conveyor 34 is at the bottom of the distributor box 16. When it is desired to offload a joint of line pipe, the distribution drum is rotated until the joint of pipe 28 drops onto the conveyor 34. Once on the conveyor 34, the joint of line pipe 28 may be fed out through an opening 36 at the back 20 of the distributor box 16.

The distribution drum 50 may be rotated by motors 38 which utilize gear reducers 40 to rotate the distribution drum.

Embodiments of the pipeline installation apparatus 10 may include a welding machine 40 as well as a water storage tank (not shown) on the same trailer member 12.

FIG. 12 shows an embodiment of the pipeline installation apparatus 10 deploying a joint of line pipe 28 into right-of-way 100 in preparation for welding that joint of pipe to a previously deployed joint of line pipe 28'. Cribbing 102 is utilized to support the deployed joint 28' while the welding operation is undertaken.

Embodiments of the present invention can be loaded with a single person. The invention can be operated by two persons in the field, such as a licensed vehicle driver and a certified welder. In the installation process, the welder walks behind the unit and stops the truck when the pipe is properly positioned with a pipe joint already staged on the ground. The welder lines up the joint being deployed with the joint staged on the ground and makes the weld.

Having thus described the preferred embodiment of the invention, what is claimed as new and desired to be protected by Letters Patent includes the following:

1. A machine for transporting and positioning joints of line pipe, the machine comprising:
   a trailer member having at least two ground engaging wheels;
   a distributer box disposed on the trailer member, the distributor box having a top, a bottom, a front and a back, where a longitudinal axis is defined between the front and the back;
   a shaft rotationally supported between the front and the back, the shaft having an axis coinciding with the longitudinal axis;
   a plurality of spaced-apart disks mounted on the rotatable shaft, each disk having a plurality of slots radially extending to a circumferential edge of the disk, each slot open-ended at the circumferential edge, wherein each disk of the plurality of spaced-apart disks has a slot in axial alignment with a slot of the other spaced-apart disks, wherein a group of the axially aligned slots is adapted to rotate into a twelve o-clock orientation to receive a joint of line pipe; and
   a conveyor at the bottom of the distributor box, wherein as the rotatable shaft turns, the conveyor is adapted to receive the joint of line pipe dropping from the group of the axially aligned slots and laterally feed the joint of line pipe out of an opening at the back of the trailer member.

2. The machine of claim 1 further comprising a welding machine mounted to the trailer.

3. The machine of claim 1 further comprising a water tank mounted to the trailer.

4. The machine of claim 1 wherein each spaced-apart disk comprises a support structure having a plurality of bolt-on segments, each bolt-on segment having an open-ended slot adapted to receive the joint of line pipe.

5. The machine of claim 1 wherein each slot comprises a wear pad.

6. The machine of claim 1 further comprising a motor for rotating the shaft.

7. The machine of claim 1 further comprising a blocking member disposed above the conveyor, the blocking member having an open position in which the joint of pipe falls to the conveyor and the blocking member having a closed position in which the joint of pipe is retained within the group of the axially aligned slots.

8. A method for transporting and positioning joints of line pipe, the method comprising:
   placing a first joint of line pipe into a distributor box comprising a plurality of distributor box sections attached to a trailer member, the trailer member having at least two ground engaging wheels, the distributor box comprising a top, a bottom, a front and a back, where a longitudinal axis is defined between the front and the back, the distributor box further comprising a shaft rotationally supported between the front and the back, the shaft having an axis coinciding with the longitudinal axis, the shaft comprising a plurality of spaced-apart disks in facing relation each disk disposed within a distributor box section wherein a disk clearance is defined as a distance between a circumferential edge of each disk and an interior surface of each distributor box section, wherein the shaft and the plurality of spaced-apart disks comprise a distribution drum, wherein the plurality of spaced-apart disks comprise a first set of aligned slots and a second set of aligned slots, the first set of aligned slots and the second set of aligned slots each configured to receive a single joint of line pipe, the first set of aligned slots initially positioned adjacent to the top of the distributor box, the first set of aligned slots configured to receive the first joint of line pipe, wherein each disk clearance is configured to retain the first joint of line pipe within the first set of aligned slots as each disk rotates within the distributor box section of the plurality of distributor box sections until the first set of aligned slots rotate to a bottom position;
   rotating the distribution drum to bring the second set of aligned slots to be positioned adjacent to the top of the distributor box while the first set of aligned slots rotates away from the top of the distributor box with the first joint of pipe retained within the first set of aligned slots;
   placing a second joint of pipe into the second set of aligned slots;
   moving the trailer member to a first desired location;
   rotating the distribution drum until the first set of slots is rotated to the bottom position adjacent to the bottom of the distributor box; and
   laterally dispersing the first joint of pipe from the back of the distributor box at the desired location.

9. The method of claim 8 comprising the further step of moving the trailer member to a second desired location.

10. The method of claim 9 comprising the further steps of rotating the distribution drum until the second set of slots is adjacent to the bottom of the distributor box and dropping laterally dispersing the second joint of pipe from the distributor box at the second desired location.

11. The method of claim 10 comprising the further step of welding an end of the second joint of pipe to an end of the first joint of pipe.

12. An apparatus for dispensing joints of line pipe along a pipeline right-of-way comprising:
- a mobile pipe transport unit comprising a frame;
- a plurality of distributor box sections attached to the frame; and
- a plurality of spaced-apart disks mounted on a rotatable shaft, each disk disposed within a distributor box section, each disk having a plurality of slots radially extending to a circumferential edge of the disk, each slot open-ended at the circumferential edge, wherein a disk clearance is defined as a distance between the circumferential edge and an interior surface of the respective distributor box section, wherein each disk of the plurality of spaced-apart disks has a slot in axial alignment with a slot of the other spaced-apart disks forming a group of aligned slots wherein the group of aligned slots are rotatable to a twelve o-clock orientation in which a joint of line pipe is received by the group of aligned slots, and the group of aligned slots are rotatable to a six o-clock orientation in which the joint of line pipe is dropped from the group of aligned slots, wherein the disk clearance is configured to retain the joint of line pipe within the group of aligned slots as the group of aligned slots rotates from the twelve o-clock orientation to the six o-clock orientation.

13. The apparatus of claim 12 further comprising a conveyor disposed beneath the plurality of spaced-apart disks, wherein the conveyor receives the joint of line pipe when the group of aligned slots rotates to the six o-clock orientation.

14. The apparatus of claim 13 wherein the conveyor feeds the joint of line pipe out of an opening at a rear of the mobile pipe transport unit.

15. The apparatus of claim 12 wherein the plurality of spaced-apart disks and the shaft comprise a distribution drum, the distribution drum coupled to a plurality of motors which rotate the distribution drum.

16. The apparatus of claim 13 further comprising a blocking member disposed above the conveyor, the blocking member having an open position in which the joint of pipe falls to the conveyor and the blocking member having a closed position in which the joint of pipe is retained within the group of the axially aligned slots.

17. The apparatus of claim 16 wherein the blocking member comprises a plurality of moveable blocking plates, each moveable blocking plate having a curved structure approximately matching a curvature of a bottom section of the spaced-apart disks.

* * * * *